No. 853,008. PATENTED MAY 7, 1907.
F. J. FELDT.
WAGON JACK.
APPLICATION FILED AUG. 10, 1905.
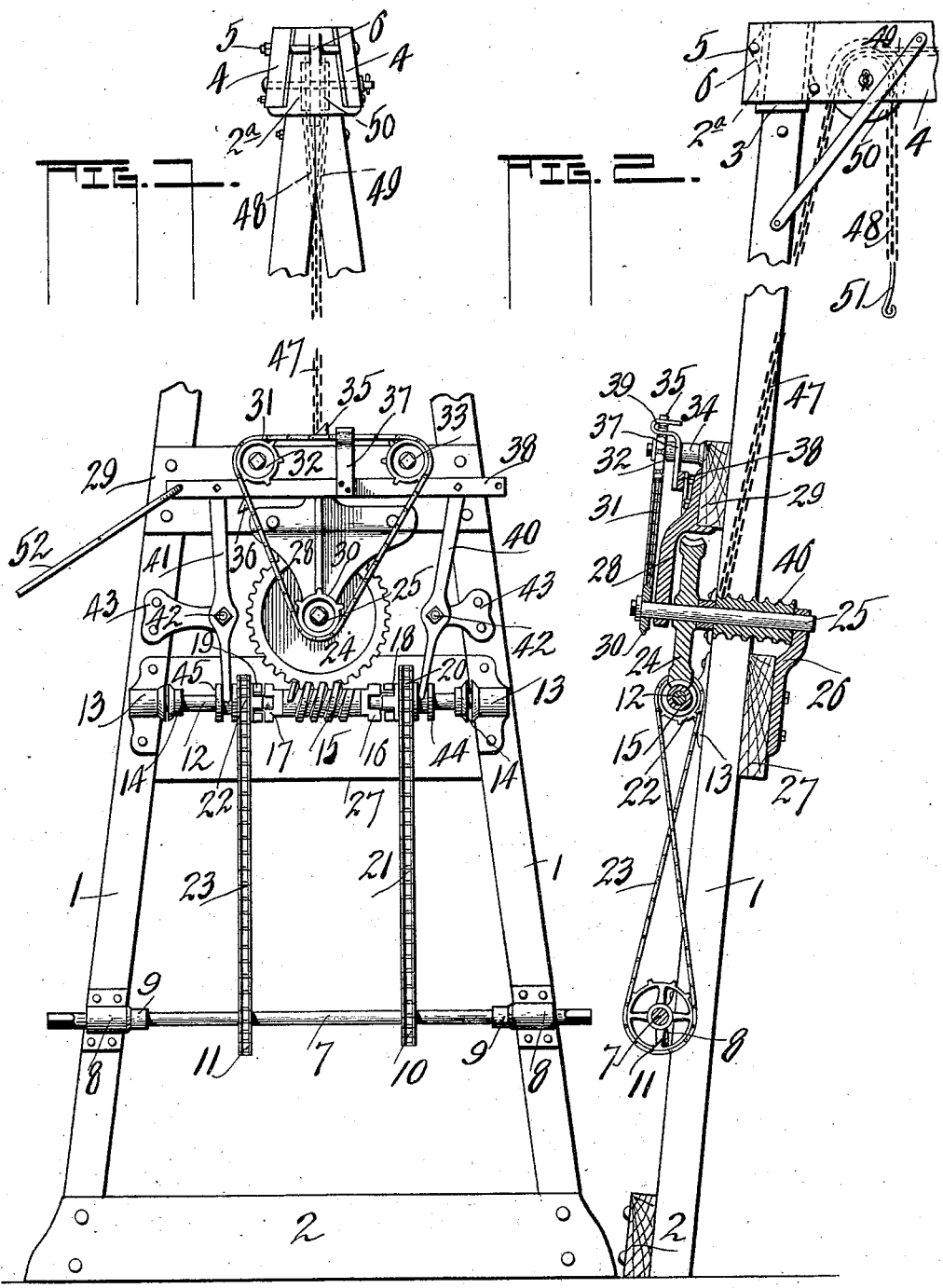

UNITED STATES PATENT OFFICE.

FERDINAND J. FELDT, OF PEORIA, ILLINOIS, ASSIGNOR TO J. A. ENGEL & CO., OF PEORIA, ILLINOIS, A CORPORATION OF ILLINOIS.

WAGON-JACK.

No. 853,008.  Specification of Letters Patent.  Patented May 7, 1907.

Application filed August 10, 1905. Serial No. 273,536.

*To all whom it may concern:*

Be it known that I, FERDINAND J. FELDT, a citizen of the United States, residing at Peoria, in the county of Peoria and State of Illinois, have invented certain new and useful Improvements in Wagon-Jacks; and I do hereby declare that the following is a full, clear, and exact description of the invention, which will enable others skilled in the art to which it appertains to make and use the same.

This invention has reference to a lift or wagon jack, and relates particularly to that type of machine wherein it is provided to raise one end of a wagon to cause any material therein to be discharged from the rear end thereof into a suitable conveyer. The mechanism for raising the wagon contains means for automatically reversing the same to lower the wagon when the wagon has reached a predetermined height.

The invention consists of a worm wheel shaft carrying a drum; an intermittingly revoluble shaft carrying a worm for actuating the worm wheel and its shaft; continuously driven clutch sprocket wheels slidable on the worm shaft adapted to alternately engage a clutch face of the worm for rotating the same in opposite directions; clutch levers and an endless belting actuated by the worm wheel shaft, carrying means adapted to have an intermittent engagement with the clutch levers for checking the rotation of the worm shaft.

For a further and full description of the invention herein and the merits thereof, and also to acquire a knowledge of the details of construction of the means for effecting the result, reference is had to the following description and drawings hereto attached.

While the essential and characteristic features of the invention are susceptible of modification, still the preferred embodiment of the invention is illustrated in the accompanying drawings, in which:—

Figure 1 is an end elevation of one end of my improved lift, showing the mechanism for elevating or lowering a wagon, and with a portion of the standards of the lift broken away; Fig. 2 shows a vertical section down through one end of the lift and the raising and lowering mechanism thereon; and in side elevation a portion of a cross-head or reach which connects the opposite standards; the opposite end of the lift being omitted.

In the drawings 1 denotes standards which preferably converge toward each other at their upper ends and are connected to each other as seen in Fig. 1. The lower ends are connected by a cross-piece or brace 2. The lift comprises four standards 1, being arranged in pairs, and spaced at suitable distances apart. Only one pair is shown in the drawings, as the others, with the exception of the elevating mechanism shown in Fig. 1 are similar to those shown and connected thereto, in a manner to be described. At the upper ends of the standards 1 where they unite, they are detachably connected in a tapered casting $2^a$, formed with flanged portions 3. To the castings $2^a$ of the standards at each side of the lift are connected the opposite ends of a pair of parallel cross-heads or reaches 4, which forms a brace for retaining the standards 1 in an upright position, and slightly inclined as shown in Fig. 2. The cross-heads 4 rest on the flanges 3 of the castings and are adapted to be bolted to the same by bolts 5 which pass through the cross-heads 4 and ears 6 formed integral with the castings $2^a$.

7 indicates a driving shaft journaled in boxings 8 attached to standards 1; being held against displacement by collars 9 carried on the said shaft, and the shaft is adapted to be connected to a suitable source of power, by a tumbling shaft (not shown) or other means. On the shaft 7 is carried the small sprocket pinion 10 and the larger sprocket wheel 11, for purposes to be described.

12 denotes a counter shaft or worm-shaft, disposed somewhat above the shaft 7, and is journaled in boxings 13 attached to the standards 1; being held against displacement by collars 14 carried on the said shaft. Fixed to rotate with the shaft 12 is a worm 15 carrying the clutch sections 16 and 17 on its opposite ends, and adapted to have an intermittent engagement with the clutch sections 16 and 17 are the clutch sections 18 and 19. The clutch section 18 is integral with the hub of a sprocket wheel 20 loosely and slidably carried on the shaft 12, being driven by a sprocket chain 21 from the pinion 10 on the shaft 7. The clutch section 19 is integral with the hub of a sprocket pinion 22 loosely and slidably carried on the shaft 12, being driven in an opposite direction to the sprocket wheel 20 by means of a sprocket chain 23, which is crossed between the wheel 11 and the pinion 22, see Fig. 2.

In mesh with the worm 15 is a worm-wheel 24 carried by a short shaft or drum shaft 25 transversely disposed above the worm shaft 12 and is journaled in a bracket 26 attached to a cross-head 27 secured to the standards 1, and a bracket 28 depending from a second cross-head 29 secured to the standards 1. On the outer end of the shaft 25 is a sprocket pinion 30 which drives an endless sprocket chain or belting 31 which travels over idler wheels 32 and 33, journaled in standards 34 secured to the cross-head 29. On the chain 31 is a pair of fingers or lugs 35 and 36 adapted to alternately engage with an arm 37, which is connected to a reciprocal bar 38; the arm 37 is formed with a loop or slotted portion 39 through which the chain 31 moves. Connected to the bar 38 at or near its opposite ends are the upper ends of levers 40 and 41, which are fulcrumed at 42 to brackets 43 secured to the standards 1. The lever 40 at its lower end is in engagement with a collar 44 integral with the hub of the sprocket wheel 20 and the clutch section 18 thereof; and the lever 41 at its lower end is in engagement with a collar 45, integral with the hub of the sprocket pinion 22 and the clutch section 19 thereof.

On the worm wheel shaft 25 to the rear of the wheel 24 is a drum 46 to which is attached a chain or cable 47 adapted to be wound and unwound thereon. This chain at a suitable point in its length diverges into two separate sections 48 and 49; both of said sections of the chain 47 are carried over a divided idler wheel 50 journaled between the two-cross-heads 4 to one side thereof. The section 48 of the chain is adapted to be carried longitudinally of the cross-heads 4 and between the same to an idler (not shown) somewhat similar to that seen at 50, journaled at the opposite ends of the cross-heads 4. The section 49 of the chain is directed downwardly after going over the idler 50, and on the ends of the sections 48 and 49 are suitable hooks 51.

When it is desired to raise the front end of a wagon to allow the material therein to run out of the rear end, after removing the rear board, the sections of chain 48 and 49 are preferably looped around the hubs of the opposite front wheels and retained so by catching the hooks 51 in one of the links. A rod 52 which is within reach of the operator and which is attached to one end or the other of the bar 38 is shifted to cause the bar 38 to be reciprocated in a direction which will connect the clutch section 18 with the clutch face 16 of the worm 15, when the power imparted to the shaft 7 will be transmitted to the drum shaft 25 through the worm-wheel 24 and cause the chain 47 to be coiled about the drum 46 and elevate the wagon. By the time the wagon has reached a height when the material therein shall have been discharged, the lug 36 of the chain 31 will have reached the arm 37 shifting it together with the bar 38 until the clutch section 18 and the wheel 20 are disengaged from the worm stopping the rotation of the shaft 12 and checking the upward movement of the wagon which will remain in its elevated position discharging the material therefrom until it is desired to reverse the movement of the parts to again lower the said wagon. To reverse the operation of the shaft 12 which is accomplished through the connection of the clutch section 19 of the pinion 22 with the worm 15 the rod 52 is operated in a direction to cause the bar 38 to shift the lever 41 in such a manner as to cause the last mentioned clutch parts to engage, the result of which will operate the parts described to lower the wagon. The hand rod 52 allows the operator to have full control of the clutch parts to disconnect the clutch sections 18 and 19 from the worm 15 when it is desired, or to shift either one into connection with the worm to raise or lower the wagon, when it is desired, all of which it is believed will be understood.

It will become apparent from the description and an examination of the drawings, that the drum shaft 25 will rotate slow for raising the wagon when the worm 15 is rotated by the sprocket wheel 20, and fast for lowering the wagon when the worm 15 is rotated in the opposite direction by the wheel 22. However, this is immaterial, as the drive may be made to run uniform in both directions. I am aware of several different lifts, some of which use a platform on which the front end of the wagon is placed when elevated; and also that a differential lift has been used. But I am not aware of a lift, where chains are used and controlled by an endless belting as herein shown.

Having thus fully described my invention, what I claim and desire to secure by Letters Patent of the United States, is:—

1. In raising and lowering mechanism, a support, an intermittingly driven worm shaft and worm, a pair of oppositely driven sprocket wheels on said shaft adapted to have a clutch engagement with said worm, and an endless belting provided with means for automatically controlling the sprocket wheels and thereby the direction of rotation of the worm shaft and worm aforesaid.

2. In raising and lowering mechanism, a support, an intermittingly driven worm shaft and worm, a pair of oppositely driven sprocket wheels on said shaft adapted to have a clutch engagement with said worm, a pair of levers connected with the said sprocket wheels, and an endless belting provided with means for controlling the movement of said levers and thereby the direction of rotation of said worm shaft and worm.

3. In raising and lowering mechanism, a worm shaft and worm, a pair of continuously and oppositely driven sprocket wheels on said shaft adapted to have clutch connection with said worm, a lever in connection with each of said sprocket wheels, and means operating at predetermined intervals for actuating said levers to check the movement of said worm shaft and worm.

4. In raising and lowering mechanism, a worm shaft and worm, a pair of continuously and oppositely driven sprocket wheels on said shaft adapted to have clutch connection with said worm, a lever in connection with each of said sprocket wheels, and an endless belting in operative connection with said levers for automatically actuating the same to check the movement of said worm shaft and worm.

5. In raising and lowering mechanism, a worm shaft and worm, a pair of continuously and oppositely driven sprocket wheels on said shaft adapted to have clutch connection with said worm, a lever in connection with each of said sprocket wheels, a drum shaft and drum in operative connection with the worm and its shaft, and an endless belting in operative connection with said levers for automatically actuating the same to check the movement of said worm shaft and worm.

6. In raising and lowering mechanism, a worm shaft and worm, clutch controlled mechanism for operating said worm and its shaft, and carried on said worm shaft a drum shaft and drum, a worm wheel on said drum shaft in operative connection with said worm, mechanism in operative connection with said clutch controlled mechanism for reversing and checking the movement of said worm shaft, and means in operative connection with the drum shaft for automatically and at predetermined intervals actuating said last mentioned mechanism for checking the movement of the worm shaft.

7. In raising and lowering mechanism, a worm shaft and worm, mechanism adapted to have clutch connection with the worm and its shaft, a drum shaft and drum, a worm wheel on said drum shaft in operative connection with said worm, a pair of levers in operative connection with said mechanism for operating the worm, a reciprocal bar for actuating said levers, and means operated by the drum shaft for automatically and at predetermined intervals actuating said reciprocal bar for shifting said levers.

8. In raising and lowering mechanism, a worm shaft and worm, mechanism adapted to have clutch connection with the worm and its shaft, a drum shaft and drum, a worm wheel on said drum shaft in operative connection with said worm, a pair of levers in operative connection with said mechanism for operating the worm, a reciprocal bar connecting said levers, an endless belting and means carried thereby adapted to engage the bar aforesaid for shifting said levers in opposite directions and at predetermined intervals.

9. In raising and lowering mechanism, a worm shaft and worm, mechanism adapted to have clutch connection with the worm and its shaft, a drum shaft and drum, a worm wheel on said drum shaft in operative connection with said worm, a pair of levers in operative connection with said mechanism for operating the worm, a reciprocal bar connecting said levers, an arm extending up from said bar, an endless belting and means carried thereby adapted at predetermined intervals to engage the arm aforesaid for shifting said bar and thereby the levers connected thereto.

10. In raising and lowering mechanism, a worm shaft and worm, mechanism adapted to have clutch connection with the worm and its shaft, a drum shaft and drum, a worm wheel on said drum shaft in operative connection with said worm, a pair of levers in operative connection with said mechanism for operating the worm, a reciprocal bar connecting said levers, an arm formed with a loop attached to said bar, an endless chain operated by said drum shaft movable through the loop of the arm, and a pair of lugs spaced at intervals apart on said chain adapted to alternately engage the arm aforesaid for shifting said bar to shift the said levers.

11. In an apparatus of the class described, the combination of a drum shaft and a drum, a chain operated by the drum having two diverging sections adapted to be looped about the hubs of the opposite wheels of a wagon, an intermittingly revoluble shaft for actuating the drum shaft and drum, driving mechanism adapted to have clutch connection with said revoluble shaft, and means for controlling the drive mechanism to check the movement of the revoluble shaft.

12. In an apparatus of the class described, the combination of a drum shaft and a drum, a chain operated by the drum having two diverging sections adapted to be looped about the hubs of the opposite wheels of a wagon, an intermittingly revoluble shaft for actuating the said drum shaft and drum, driving mechanism adapted to have clutch connection with said revoluble shaft, clutch levers for controlling the connection of such drive mechanism to said shaft, and means operated by the drum shaft for shifting said levers at predetermined intervals.

13. In an apparatus of the character described, the combination of a drum shaft and a drum, a chain operated by the drum having two diverging sections adapted to be looped about the hubs of the opposite wheels of a wagon, an intermittingly revoluble shaft for actuating the said drum, driving mechanism adapted to have clutch connection with said revoluble shaft, clutch levers for controlling the connection of such drive mechanism to said shaft, and an endless belt carrying means for operating said levers at predetermined intervals to disconnect such drive mechanism from its shaft.

14. In an apparatus of the character described, the combination of a drum shaft and a drum, a chain operated by the drum having two diverging sections adapted to be looped about the hubs of the opposite wheels of a wagon, an intermittingly revoluble shaft for actuating said drum shaft and drum, driving mechanism adapted to have clutch connection with said revoluble shaft, clutch levers for controlling the connection of such drive mechanism to said shaft, a bar connecting the free ends of said levers, a hand lever for controlling the movement of said bar, also an endless belt carrying means for operating the said bar and thereby the levers.

15. In an apparatus of the character described, the combination of a drum shaft and drum, means in connection with the drum and operated thereby adapted to be looped about the hubs of the opposite wheels of a wagon, an intermittingly revoluble shaft in operative connection with the drum shaft, a pair of sprocket wheels loosely carried on said shaft and revoluble in opposite directions, means for driving said wheels, and means for connecting the sprocket wheels to their carrying shaft.

16. In an apparatus of the character described, the combination of a drum shaft and drum, means in connection with the drum and operated thereby adapted to be looped about the hubs of the opposite wheels of a wagon, an intermittingly revoluble shaft in operative connection with the drum shaft, a pair of sprocket wheels loosely carried on said shaft and revoluble in opposite directions on said shaft, means whereby said wheels may be alternately connected to their carrying shaft, and means for disconnecting the said wheels from their shaft.

17. In an apparatus of the character described, the combination of a drum shaft and a drum, means in connection with the drum and operated thereby adapted to be looped about the hubs of the opposite wheels of a wagon, an intermittingly revoluble shaft in operative connection with the drum shaft, a pair of sprocket wheels loosely carried on said shaft and revoluble in opposite directions, a single drive shaft for both of said wheels, means whereby the wheels may be alternately connected to their carrying shaft, levers in connection with said wheels, and means for operating said levers and thereby connect or disconnect said wheels with their carrying shaft.

18. In an apparatus of the character described, the combination of a support, a divided pulley journaled at or near one end thereof, a drum shaft and a drum, a chain connected to said drum and having diverging sections carried over the pulley aforesaid, and a reversible drive for operating said drum shaft and drum, substantially as described.

In testimony whereof I affix my signature, in presence of two witnesses.

FERDINAND J. FELDT.

Witnesses:
CHAS. N. LA PORTE,
H. V. GIBSON.